United States Patent
Uchiyama et al.

(10) Patent No.: US 9,962,870 B2
(45) Date of Patent: May 8, 2018

(54) INJECTION MOLDING MACHINE INCLUDING A PLURALITY OF INJECTION UNITS

(71) Applicant: FANUC Corporation, Yamanashi (JP)

(72) Inventors: Tatsuhiro Uchiyama, Yamanashi (JP); Atsushi Horiuchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 282 days.

(21) Appl. No.: 14/876,979

(22) Filed: Oct. 7, 2015

(65) Prior Publication Data

US 2016/0101559 A1 Apr. 14, 2016

(30) Foreign Application Priority Data

Oct. 8, 2014 (JP) ................................. 2014-207476

(51) Int. Cl.
*B29C 49/06* (2006.01)
*G05B 19/414* (2006.01)
(Continued)

(52) U.S. Cl.
CPC .............. *B29C 45/13* (2013.01); *B29C 45/84* (2013.01); *B29C 2947/9259* (2013.01); *B29C 2947/92095* (2013.01); *B29C 2947/92295* (2013.01); *B29C 2947/92457* (2013.01); *B29C 2947/92952* (2013.01)

(58) Field of Classification Search
CPC ................... B29C 45/13; B29C 45/84; B29C 2947/92952; B29C 2947/92095; B29C 2947/92457; B29C 2947/92295; B29C 2947/9259
See application file for complete search history.

(56) References Cited

U.S. PATENT DOCUMENTS 5,536,159 A * 7/1996 Yamamura .............. B29C 45/76
425/149
5,817,258 A * 10/1998 Ito ......................... B29C 45/762
264/40.1
(Continued)

FOREIGN PATENT DOCUMENTS

CN 101268428 A 9/2008
CN 101590688 A 12/2009
(Continued)

OTHER PUBLICATIONS

Decision to Grant a Patent dated Jan. 26, 2016, in Japanese Patent Application No. 2014-207476.
(Continued)

*Primary Examiner* — Charles Kasenge
(74) *Attorney, Agent, or Firm* — Hauptman Ham, LLP

(57) ABSTRACT

An injection molding machine includes first and second injection units. When it is detected that the first injection unit malfunctions, information that notifies the other injection unit (that is, second injection unit) the fact that the first injection unit is malfunctioning is outputted. The second injection unit that has acquired the malfunction information from the first injection unit carries out a malfunction process based on a preset malfunction process setting corresponding to other-injection-unit malfunction information.

8 Claims, 7 Drawing Sheets

(51) Int. Cl.
*B29C 45/13* (2006.01)
*B29C 45/84* (2006.01)

(56) References Cited

U.S. PATENT DOCUMENTS

| | | | | |
|---|---|---|---|---|
| 2004/0148136 A1* | 7/2004 | Sasaki | ................ | G05B 19/4065 |
| | | | | 702/188 |
| 2006/0068049 A1* | 3/2006 | Nishizawa | .............. | B29C 45/76 |
| | | | | 425/145 |
| 2008/0184114 A1 | 7/2008 | Hano | | |
| 2013/0156875 A1* | 6/2013 | Maruyama | .............. | B29C 45/84 |
| | | | | 425/150 |

FOREIGN PATENT DOCUMENTS

| | | | |
|---|---|---|---|
| JP | H10-58479 A | 3/1998 |
| JP | 11-348087 A | 12/1999 |
| JP | 2001-079877 A | 3/2001 |
| JP | 2001-219456 A | 8/2001 |
| JP | 2002-331560 A | 11/2002 |
| JP | 2010-94886 A | 4/2010 |
| JP | 2013-75375 A | 4/2013 |

OTHER PUBLICATIONS

Office Action in CN Application No. 201510640902.6, dated Apr. 5, 2017.

* cited by examiner

FIG. 4A

MALFUNCTION PROCESS OF HANDLING MALFUNCTIONING INJECTION UNIT

| No. | MALFUNCTION INFORMATION FROM MALFUNCTIONING INJECTION UNIT | MALFUNCTION PROCESS SETTING |
|---|---|---|
| 1 | EXCESS INJECTION PRESSURE HAS OCCURRED | · OPERATION IS STOPPED INSTANTLY<br>· OUTPUT ALARM |
| 2 | RESIN HAS RUN OUT | · OPERATION IS STOPPED WHEN PRESENT MOLDING CYCLE IS COMPLETED<br>· CHANGE SET TEMPERATURE OF HEATER TO LOWER TEMPERATURE<br>· OUTPUT ALARM |
| 3 | EXCESS TEMPERATURE OF HEATED CYLINDER HAS OCCURRED | · OPERATION IS STOPPED WHEN PRESENT MOLDING CYCLE IS COMPLETED<br>· TURN OFF HEATER<br>· OUTPUT ALARM |
| 4 | INJECTION PRESSURE HAS NOT FALLEN WITHIN SPECIFIED RANGE | · OPERATION IS STOPPED WHEN PRESENT MOLDING CYCLE IS COMPLETED<br>· OUTPUT DEFECT SIGNAL |

FIG. 4B

MALFUNCTION PROCESS CARRIED OUT WHEN MALFUNCTION
INFORMATION IS INPUTTED FROM ANOTHER INJECTION UNIT

| No. | MALFUNCTION INFORMATION INPUTTED FROM ANOTHER INJECTION UNIT | MALFUNCTION PROCESS SETTING |
|---|---|---|
| 1 | EXCESS INJECTION PRESSURE HAS OCCURRED | · PREVENT START OF INJECTION |
| 2 | RESIN HAS RUN OUT | · OPERATION IS STOPPED WHEN PRESENT MOLDING CYCLE IS COMPLETED<br>· CHANGE SET TEMPERATURE OF HEATER TO LOWER TEMPERATURE |
| 3 | EXCESS TEMPERATURE OF HEATED CYLINDER HAS OCCURRED | · OPERATION IS STOPPED WHEN PRESENT MOLDING CYCLE IS COMPLETED<br>· TURN OFF HEATER |
| 4 | INJECTION PRESSURE HAS NOT FALLEN WITHIN SPECIFIED RANGE | · PREVENT START OF INJECTION<br>· OUTPUT DEFECT SIGNAL |

INJECTION MOLDING MACHINE INCLUDING A PLURALITY OF INJECTION UNITS

RELATED APPLICATIONS

The present application claims priority to Japanese Application Number 2014-207476, filed Oct. 8, 2014, the disclosure of which is hereby incorporated by reference herein in its entirety.

BACKGROUND OF THE INVENTION

Field of the Invention

The present invention relates to an injection molding machine, and particularly to an injection molding machine including a plurality of injection units with respect to a single mold clamping mechanism.

Description of the Related Art

In an injection molding machine, materials of two or more colors or materials different from one another are used to perform injection molding in some cases. In such cases, two or more injection units are provided with respect to a single mold clamping device so that the injection units inject two or more types of resin into the die to produce molded articles.

Japanese Patent Application Laid-Open Nos. 10-58479, 2001-79877, and 2001-219456 disclose technologies about a molding method and an injection molding machine in which one mold clamping device is provided with respect to a plurality of injection units and the plurality of injection units are sequentially operated to mold a unitary molded article made of a plurality of materials. Among the patent documents described above, Japanese Patent Application Laid-Open No. 2001-79877 discloses a technology for performing sequence control in a predetermined order on independent motion of each of two injection molding machines provided for one mold clamping device.

Each of the patent documents described above discloses an injection molding machine that uses a plurality of injection units to mold a unitary molded article and an injection molding method using the injection molding machine but does not describe anything about how to handle malfunction of the injection molding machine. Therefore, when one of the plurality of injection units malfunctions, simply stopping the malfunctioning injection unit itself may still allow the other injection units to keep operating and molding an unintended molded article because the other injection units are not configured to execute an appropriate processing.

SUMMARY OF THE INVENTION

An object of the invention is to provide an injection molding machine including a plurality of injection units for one die and one mold clamping device and capable of stopping operating by executing an appropriate processing when the injection molding machine malfunctions.

A first aspect of an injection molding machine according to the present invention includes a plurality of injection units and a plurality of controllers corresponding to the plurality of injection units. Each of the plurality of controllers includes a malfunction detection section that detects malfunction of the injection unit corresponding to the controller, a malfunction information output section that outputs malfunction information corresponding to the type of the malfunction detected by the malfunction detection section, and an other-injection-unit malfunction information acquisition section that acquires, as other-injection-unit malfunction information, malfunction information outputted by the malfunction information output section of another controller contained in the plurality of controllers but different from the controller. The other-injection-unit malfunction information acquisition section is configured to carry out a malfunction process for the injection unit based on a preset malfunction process setting corresponding to the other-injection-unit malfunction information when receiving the other-injection-unit malfunction information.

In the injection molding machine thus configured, when malfunction occurs, malfunction information is outputted to the controllers associated with the other injection units that form the injection molding machine. The controller associated with each of the other injection units having received the malfunction information carries out a malfunction process based on a preset malfunction process setting corresponding to the other-injection-unit malfunction information. When an injection unit malfunctions, the configuration described above can prevent the injection units other than the malfunctioning injection unit from keeping operating to mold an unintended molded article, inappropriate stop operation that delays the following restoration operation from being performed, and other problems from occurring.

The other-injection-unit malfunction information acquired by the other-injection-unit malfunction information acquisition section can contain malfunction source identification information that identifies the controller having outputted the other-injection-unit malfunction information.

The embodiment described above, in which the other-injection-unit malfunction information contains malfunction source identification information that identifies the controller having outputted the other-injection-unit malfunction information, allows identification of which injection unit has outputted the malfunction information, for example, in a case where a specific malfunction process needs to be carried out on an injection unit basis.

A second aspect of an injection molding machine according to the present invention includes a plurality of injection units and a plurality of controllers corresponding to the plurality of injection units. Each of the plurality of controllers includes a malfunction detection section that detects malfunction of the injection unit corresponding to the controller, a malfunction process information output section that reads malfunction process information corresponding to the type of the malfunction detected by the malfunction detection section from a preset malfunction process setting corresponding to the type of the malfunction, stored in advance, and outputs the read malfunction process information, and an other-injection-unit malfunction process information acquisition section that acquires, as other-injection-unit malfunction process information, malfunction process information outputted by the malfunction process information output section of another controller contained in the plurality of controllers but different from the controller. The other-injection-unit malfunction process information acquisition section is configured to carry out a malfunction process for the injection unit based on the other-injection-unit malfunction process information.

In the injection molding machine thus configured, when malfunction occurs, malfunction process information is outputted to the controllers associated with the other injection units that form the injection molding machine. The controller associated with each of the other injection units having received the malfunction process information carries out a malfunction process based on the received malfunction process information. When an injection unit malfunctions, the configuration described above can prevent the injection units other than the malfunctioning injection unit from keeping operating to mold an unintended molded article, inappropriate stop operation that delays the following restoration operation from being performed, and other problems from occurring.

The present invention, which provides the configuration described above, provides an injection molding machine including a plurality of injection units for one die and one mold clamping device and capable of stopping operating by executing an appropriate processing when the injection molding machine malfunctions.

BRIEF DESCRIPTION OF THE DRAWINGS

The above and other objects and features of the present invention will be apparent from the following description of embodiments with reference to the accompanying drawings, in which:

FIG. 4A shows preset examples of a malfunction process to be carried out when one of controllers associated with a plurality of injection units detects a malfunction signal from one injection unit corresponding to the controller;

FIG. 4B shows examples of a malfunction process to be carried out when one of the controllers associated with a plurality of injection units detects a malfunction signal from an injection unit different from the injection unit corresponding to the controller;

DETAILED DESCRIPTION OF THE PREFERRED EMBODIMENT

Figure 1:
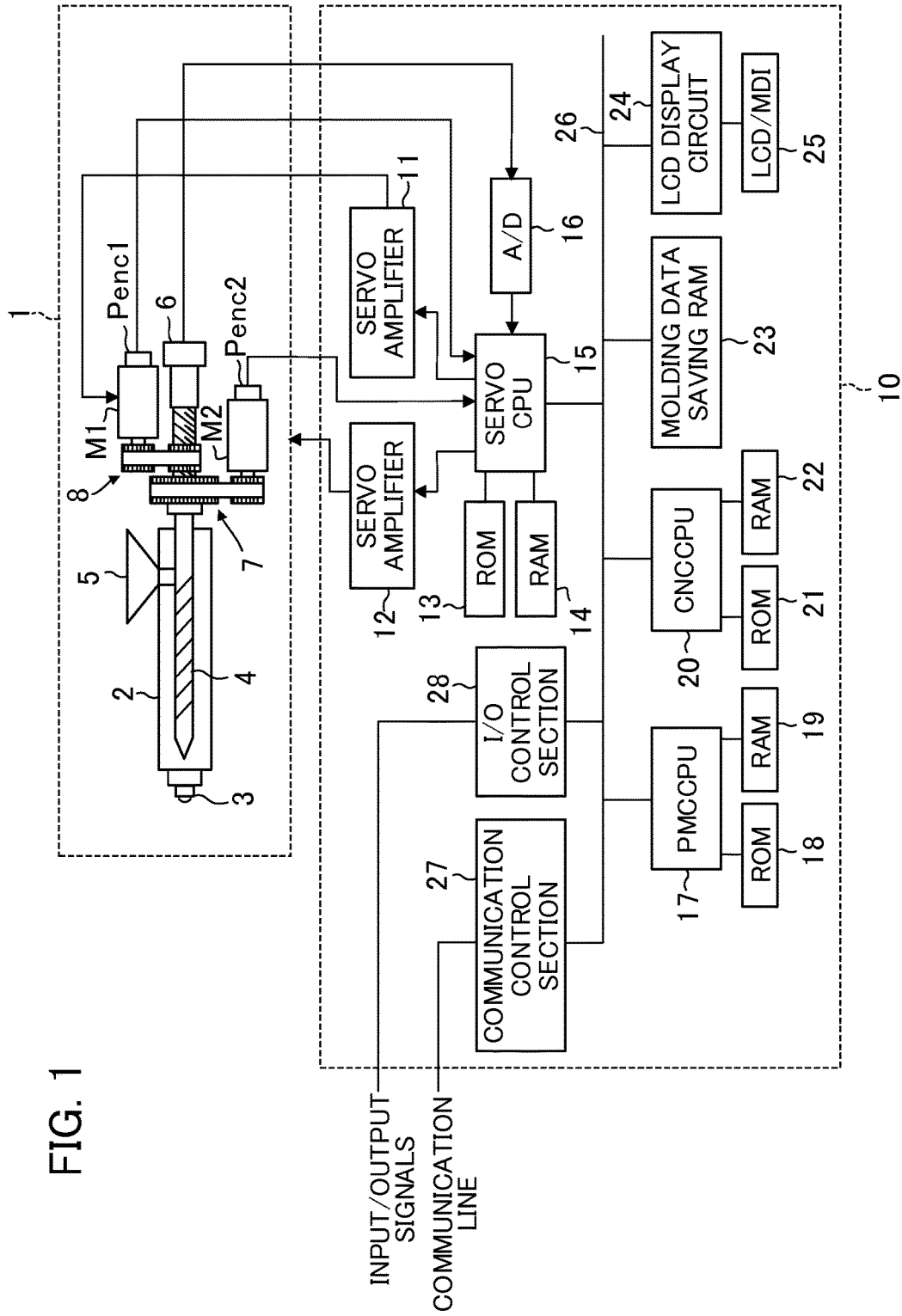
FIG. 1 shows the configuration of an injection molding machine formed of an injection unit and a controller.
Figure 2:
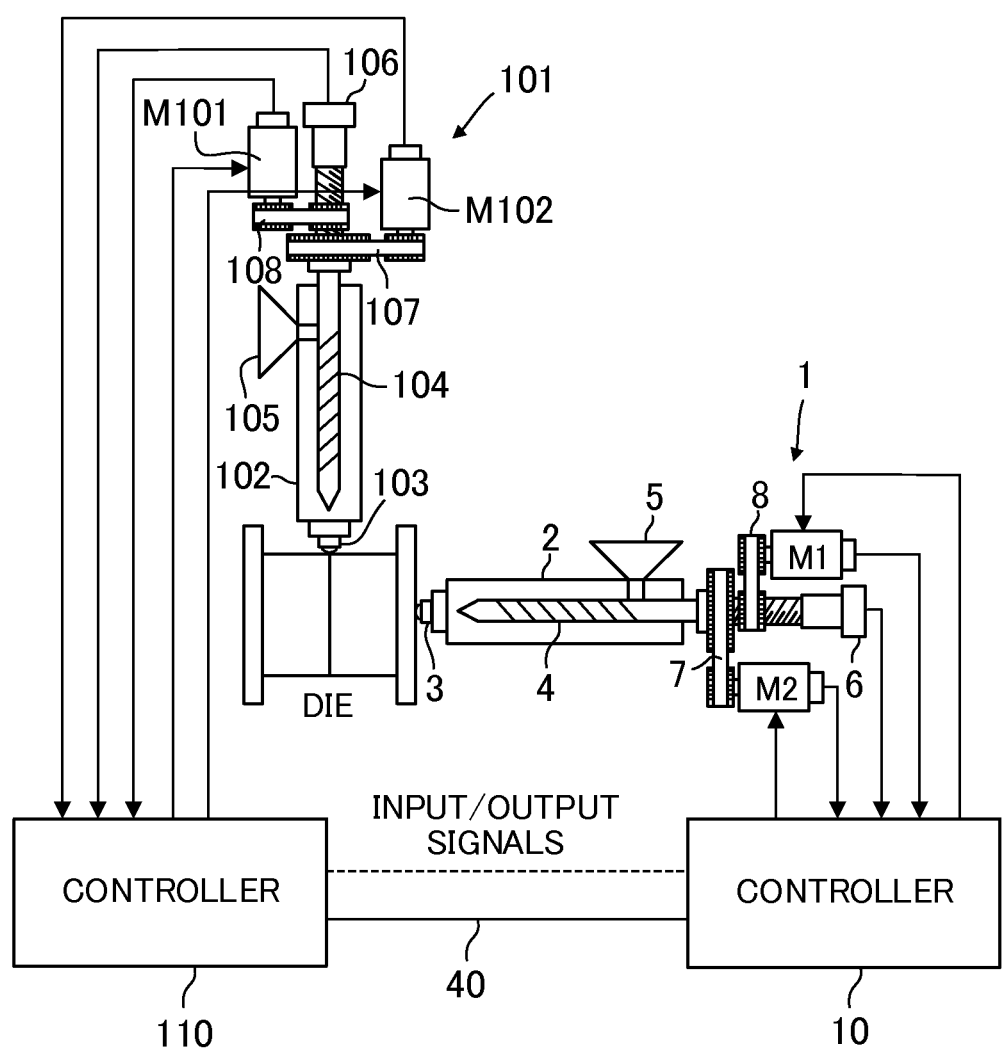
FIG. 2 shows an embodiment of an injection molding machine according to the present invention including a plurality of injection molding machines (injection units and controllers) shown in FIG. 1.

FIG. 1 shows the configuration of an injection molding machine formed of an injection unit and a controller, and FIG. 2 shows the configuration of an injection molding machine including a plurality of injection molding machines (injection units and controllers) shown in FIG. 1.

The injection molding machine is formed of an injection unit 1, a mold clamping device (not shown), and a controller 10. The controller is configured to control the injection unit 1 as a whole, as shown in FIG. 1.

In the injection unit 1, a nozzle 3 is mounted onto the front end of a cylinder 2, into which a screw 4 is inserted, and a hopper 5, which supplies the cylinder 2 with a resin pellet, is attached to a rear end portion of the cylinder 2. The screw 4 is driven in the axial direction by a servo motor M1 for injection, a transmission mechanism 8, and other components, which form drive means for driving the screw 4 in the axial direction, for injection and back pressure control. Further, the screw 4 is rotated by a servo motor M2 and a transmission mechanism 7, which is formed of a belt, a pulley, and other components, which form rotary drive means for rotating the screw 4.

A first position/speed detector Penc1, which detects the rotational position/speed of the servo motor M1 for injection, is attached thereto. Similarly, a second position/speed detector Penc2, which detects the rotational position/speed of the servo motor M2 for screw rotation, is attached thereto. The first and second position/speed detectors Penc1, Penc2 can detect the position of the screw 4 (position in screw axis direction), the moving speed (injection speed), and the rotational speed of the screw 4. The force applied by melted resin to the screw 4 in the screw axis direction is detected with a force detector 6, such as a load cell.

A ROM 18, which stores, for example, a sequence program that controls sequence motion of the injection molding machine, and a RAM 19, which is used, for example, to temporarily store computation data, are connected to a PMC-CPU 17. A ROM 21, which stores, for example, an automatic operation program that controls the injection molding machine as a whole, and a RAM 22, which is used, for example, to temporarily store computation data, are connected to a CNC-CPU 20.

A ROM 13, which stores a control program dedicated to servo control responsible for position, speed, and current loop processing, and a RAM 14, which is used to temporarily store data, are connected to a servo CPU 15. A servo amplifier 11, which drives the serve motor M1 for injection based on an instruction from the servo CPU 15, and a servo amplifier 12, which drives the serve motor M2 for screw rotation based on an instruction from the servo CPU 15, are further connected to the servo CPU 15.

The first and second position/speed detectors Penc1, Penc2 are attached to the servo motors M1 and M2, respectively, as described above. Outputs from the position/speed detectors Penc1 and Penc2 are fed back to the servo CPU 15. The servo CPU 15 performs position and speed feedback control based on movement commands issued from the CNC-CPU 20 to the axes (servo motor M1 for injection and servo motor M2 for screw rotation) and detected positions/speeds fed back from the first and second position/speed detectors Penc1, Penc2 and further performs current feedback control to drive and control the servo amplifier 11, which drives the servo motor M1 for injection, and the servo amplifier 12, which drives the servo motor M2 for screw rotation.

A present position register (not shown) that determines the forward movement position (axial position) of the screw 4 based on a position feedback signal from the first position/speed detector Penc1, is provided, and the present position register allows detection of the position of the screw 4. Further, resin pressure (resin pressure acting on screw) in the form of a digital signal into which an A/D converter 16 converts a detection signal from the force detector 6 is inputted to the servo CPU 15.

An LCD/MDI (input device with display device) 25, which has a display device formed, for example, of a liquid crystal display device, is connected to a bus 26 via an LCD display circuit 24. Further, a molding data saving RAM 23, which is formed of a nonvolatile memory, is also connected to the bus 26. The molding data saving RAM 23 stores a molding condition on injection molding, a variety of setting values, parameters, and macro variables, and other types of information.

A communication control section 27, which controls transmission and reception of signals to and from a communication line, and an I/O control section 28, which controls input/output signals, are further provided and connected to the bus 26.

According to the configuration described above, the PMC-CPU 17 controls the sequence motion of the entire injection molding machine, and the CNC-CPU 20 distributes movement commands to the servo motors M1 and M2 for the respective axes based on the operation program in the ROM 21 and the molding condition and other parameters stored in the molding data saving RAM 23. The servo CPU 15 then performs position loop control and speed loop control as in related art and further performs current loop servo control, that is, carries out a digital servo process based, for example, on the movement commands distributed to the respective axes (servo motor M1 for injection and servo motor M2 for screw rotation) and feedback signals for the position and speed detected with the position/speed detectors Penc1 and Penc2.

Molding motion steps carried out by an injection molding machine typically include a die closing step of closing a die in a mold clamping device for die clamping, an injection step of moving the screw forward in the injection unit to inject melted resin into the die to fill the die, a packing step of controlling the pressure of the resin in the die after the die is filled with the melted resin, a cooling step of cooling the resin in the die, a metering step of rotating the screw to melt the resin while applying back pressure to the screw and metering the melted resin, a die opening step of opening the die in the mold clamping device, an ejection step of ejecting and removing a molded article from the die.

As a widely used method for controlling the motion of the screw in an injection molding machine, in general, screw position/speed control is performed from the start of injection until a predetermined screw position is reached, and the control is switched to pressure control after the screw reaches the predetermined position (injection/packing switching position), whereby packing process is performed.

According to the present invention, in the injection/packing steps, the pressure control is performed based on the magnitude of the force detected with the force detector 6 described above, whereby highly responsive pressure control can be performed without any delay in the response speed to the signal detection.

FIG. 2 shows the configuration of an injection molding machine including a plurality of injection units.

The configurations of a first injection unit 1 and a first controller 10 are the same as those of a second injection unit 101 and a second controller 110.

The communication control section 27 in the first controller 10 and a communication control section (not shown) in the second controller 110 are connected to each other via a communication line, and the I/O control section 28 in the first controller 10 and an I/O control section (not shown) in the second controller 110 output and input signals to and from each other.

Each of the position/speed detectors Penc1 and Penc2, with which the servo motor M1 for injection and the servo motor M2 for screw rotation are provided, outputs a malfunction signal when position or speed malfunction occurs in operation. The force detector 6 further outputs a malfunction signal when the screw 4 is in operation and an abnormality of pressure is detected.

Further, the servo amplifiers 11 and 12, which drive the servo motor M1 for injection and the servo motor M2 for screw rotation, are provided with current detectors (not shown) for detecting electric current that drives the servo motor M1 for injection and the servo motor M2 for screw rotation, and the current detectors allow current feedback control and output malfunction signals when current malfunction is detected when the servo motor M1 for injection and the servo motor M2 for screw rotation are in operation.

A heater (not shown) that melts the resin and a thermocouple (not shown) that detects the actual temperature of the resin are provided in the cylinder 2 in the injection unit, whereby temperature control is performed according to a preset temperature and a malfunction signal is output when the actual temperature exceeds a specified temperature. As described above, the injection unit is provided with a variety of detectors, each of which detects malfunction and outputs a malfunction signal.

FIG. 4A shows examples of a malfunction process to be carried out when one of the controllers (first controller 10, for example) associated with a plurality of injection units detects a malfunction signal from one injection unit corresponding to the controller (injection unit 1, for example). As shown in FIG. 4A, a preset malfunction process is carried out in accordance with the type of malfunction information on malfunction that occurs in the injection unit.

Figure 3A:
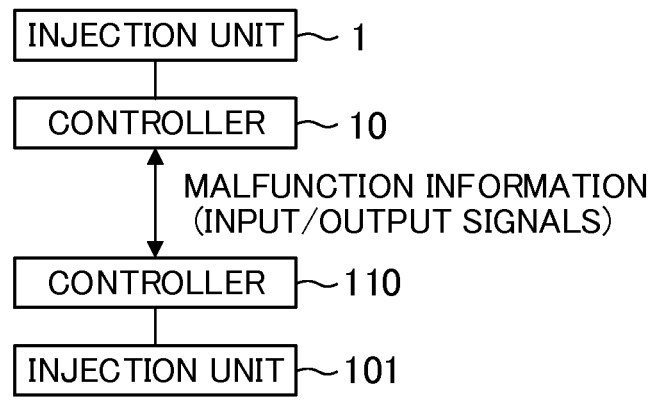
FIGS. 3A and 3B show input/output of signals between controllers associated with injection units shown in FIG. 2.
Figure 3B:
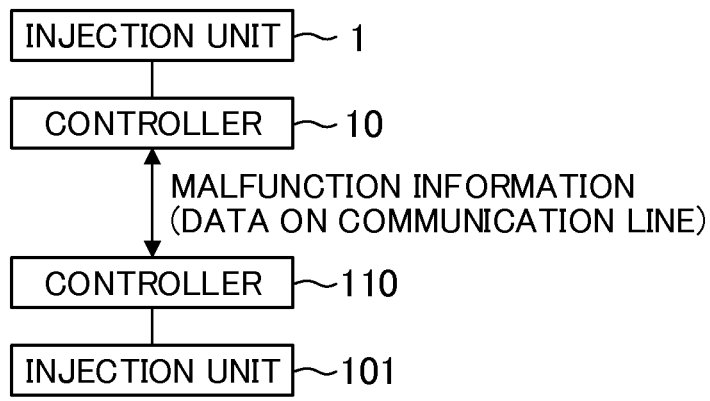

The controller 10 or 110 detects a malfunction signal from the injection unit 1 or 101 corresponding to the controller 10 or 110, carries out a malfunction process in accordance with the setting of the malfunction process corresponding to one of the types of malfunction set in advance, such as those as shown in FIG. 4A, and simultaneously transmits the detected malfunction signal to the controller of the other injection units. Input and output of signals between the controllers may be so performed that an electric signal outputted, for example, from a relay or a semiconductor device is inputted or outputted via the I/O control section 28, as shown in FIG. 3A, or the injection units may be connected to each other via a communication line 40 and data may be inputted or outputted via the communication control section 27, as shown in FIG. 3B.

In a case where it is necessary to carry out a specific malfunction process on an injection unit basis and it is therefore necessary to identify which injection unit has outputted malfunction information, injection unit identification information (malfunction source identification information), such as an ID, given to each injection unit may be contained in malfunction information, and the resultant malfunction information may be outputted as a malfunction signal.

On the other hand, FIG. 4B shows preset examples of a malfunction process to be carried out when one of the controllers (first controller 10, for example) associated with a plurality of injection units detects a malfunction signal from another injection unit (injection unit 101, for example) different from the injection unit corresponding to the controller.

The injection unit that has received a malfunction signal from another injection unit carries out a malfunction process based on a malfunction process setting for each type of malfunction information from the another injection unit, as shown in FIG. 4B. The malfunction process to be carried out by the injection unit that has received a malfunction signal includes not only processes of handling excess injection pressure, lack of the resin, excessively high temperature of the heated cylinder, and discrepancy from specified injection pressure, as shown in FIG. 4B, but also processes of instantaneously stopping operation, stopping operation after completion of the present molding cycle, turning off of the heater, changing the set temperature of the heater to a low temperature, retracting the injection unit, discharging the resin, outputting an alarm such as an alarm lamp, displaying malfunction information on a display screen, outputting a defect signal. These malfunction processes may be carried out independently or in combination.

A description will next be made of specific case examples of a malfunction process in a case where malfunction is detected with reference to FIGS. 4A and 4B. In the following description, it is assumed that the injection molding machine includes two injection units (the first and second injection units 1, 101) and two controllers (the first and second controllers 10, 110) corresponding these injection units, as shown in FIG. 2.

A first case example is a case where excess injection pressure occurs. When excess pressure occurs in the first injection unit 1 during injection, if the second injection unit 101 performs injection, the excess pressure would possibly breaks the die. To avoid this situation, the first injection unit 1 is instantly caused to stop operating and an alarm is outputted, and the second injection unit 101 is not allowed to start injection, as shown in FIGS. 4A and 4B.

A second case example is a case where the resin has run out. When the resin has run out in the first injection unit 1, breakage of the die or other problems do not occur even when the second injection unit 101 is not caused to immediately stop operating. In this case, the first injection unit 1 is caused to stop operating when the present molding cycle is completed, and the set temperature of the heater is changed to a low temperature and an alarm may be inputted, as shown in FIGS. 4A and 4B. At the same time, the second injection unit 101 is also caused to stop operating after the present molding cycle is completed and the heater is turned off. In the case example described above, the first and second injection units 1, 101 may be both retracted, the temperature of each of the heated cylinders may be lowered until the resin is ready, and the resin may be discharged for prevention of degradation of the resin in the heated cylinders.

A first example of a malfunction process to be carried out by one controller (controller 10, for example) in the injection molding machine shown in FIG. 2 will next be described with reference to the flowchart shown in FIG. 5 on a step basis.

(Step SA1) It is determined whether or not malfunction has occurred in the injection unit 1 corresponding to the controller 10. When malfunction has occurred (YES), the control proceeds to step SA2, whereas when no malfunction has occurred (NO), the control proceeds to step SA4.

(Step SA2) Malfunction information is outputted from the controller 10 in the form of a malfunction signal in accordance with the type of the malfunction that has occurred.

(Step SA3) A malfunction process for the injection unit 1 is carried out in accordance with a process setting (FIG. 4A) stored in a memory in the controller 10, and the injection molding machine is caused to stop operating.

(Step SA4) It is determined whether or not malfunction information has been inputted in the form of a malfunction signal from the controller 110 of the other injection unit 101 to the controller 10. When malfunction information has been inputted (YES), the control proceeds to step SA5, whereas when no malfunction information has been inputted (NO), the control returns to step SA1.

(Step SA5) A malfunction process for the injection unit 101 is carried out in accordance with a process setting (FIG. 4B) stored in the memory in the controller 10, and the injection molding machine is caused to stop operating.

Figure 5:
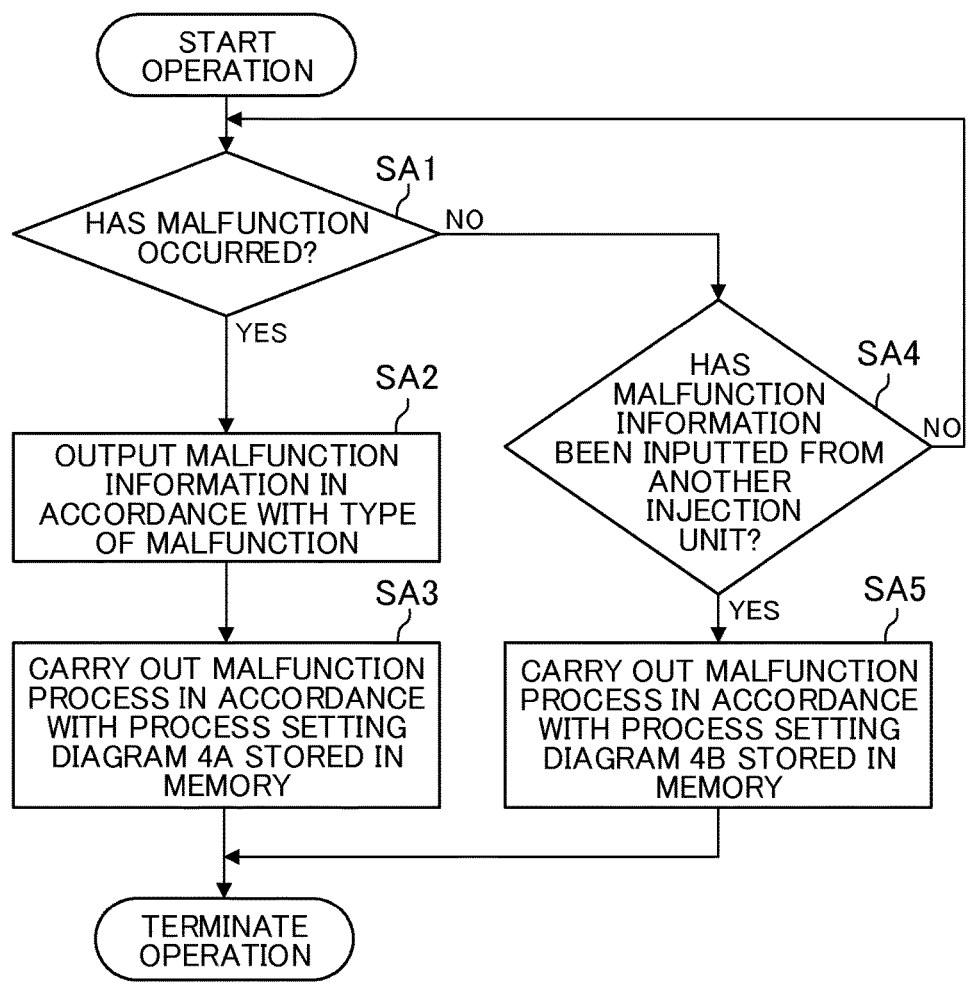
FIG. 5 is a flowchart showing a first example of a malfunction process to be carried out by one controller in the injection molding machine shown in FIG. 2.

In the procedure shown in the flowchart of FIG. 5, when one controller 10 detects a malfunction signal, input and output of malfunction information is performed in the form of a malfunction signal between the controller 10 and the other controller 110 by using the method shown in FIG. 3A or 3B, and a malfunction process based on the malfunction information in the malfunction signal is carried out in the controller 10. Instead, the controller 10 may receive malfunction process information from the controller 10 and the other controller 110 and carry out a malfunction process for the injection unit 1 according to the type of the malfunction in accordance with the received malfunction process information.

In the present embodiment, in each of a plurality of controllers is set and stored not only a malfunction process to be carried out by any one controller when the injection unit corresponding to the controller malfunctions, as shown in the table of FIG. 4A, but also a malfunction process to be carried out by the above controller when another injection unit malfunctions, as shown in the table of FIG. 4B. When the controller detects that the injection unit corresponding to the controller or any of the other injection units malfunctions, the controller carries out a malfunction process for the malfunctioning injection unit in accordance with the table shown in FIG. 4A and reads and outputs malfunction process information on the another injection unit that corresponds to the type of the detected malfunction based on the table shown in FIG. 4B.

When the controller then acquires malfunction process information from an injection unit different from the injection unit corresponding to the controller, the controller carries out a malfunction process based on the acquired malfunction process information. In a case where it is necessary to carry out a specific malfunction process on an injection unit basis and it is therefore necessary to identify which injection unit has outputted malfunction information, injection unit identification information (malfunction source identification information), such as an ID, given to each injection unit may be contained in malfunction information.

Figure 6:
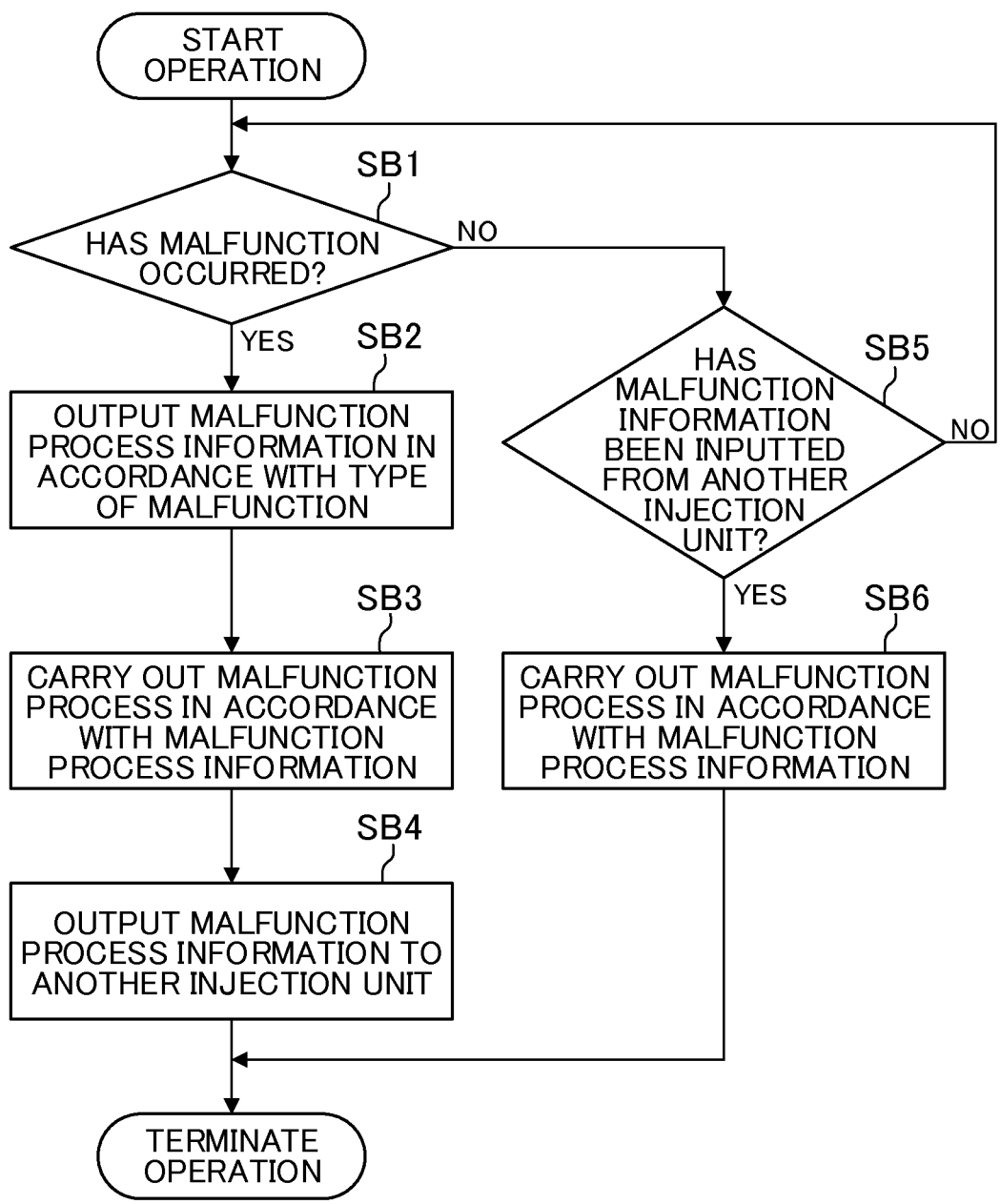
FIG. 6 is a flowchart showing a second example of the malfunction process to be carried out by one controller in the injection molding machine shown in FIG. 2.

A second example of a malfunction process to be carried out by one controller (controller 10, for example) in the injection molding machine shown in FIG. 2 will next be described with reference to the flowchart shown in FIG. 6 on a step basis.

(Step SB1) It is determined whether or not malfunction has occurred in the injection unit 1 corresponding to the controller 10. When malfunction has occurred (YES), the control proceeds to step SB2, whereas when no malfunction has occurred (NO), the control proceeds to step SB5.

(Step SB2) Malfunction information is outputted from the controller 10 in the form of a malfunction signal in accordance with the type of the malfunction that has occurred.

(Step SB3) A malfunction process for the injection unit 10 is carried out in accordance with the malfunction process information.

(Step SB4) Malfunction process information is outputted to the controller associated with the other injection unit 110.

(Step SB5) It is determined whether or not malfunction process information has been inputted in the form of a malfunction signal from the controller 110 of the other injection unit 101 to the controller 10. When malfunction process information has been inputted (YES), the control proceeds to step SB6, whereas when no malfunction process information has been inputted (NO), the control returns to step SB1.

(Step SB6) A malfunction process for the injection unit 101 is carried out in accordance with the malfunction process information.

What is claimed is:

1. An injection molding machine comprising:
a plurality of injection units; and
a plurality of controllers corresponding to the plurality of injection units,
wherein each of the plurality of controllers includes
a malfunction detection section that detects malfunction of the injection unit corresponding to the controller,
a malfunction information output section that outputs malfunction information corresponding to the type of the malfunction detected by the malfunction detection section, and
an other-injection-unit malfunction information acquisition section that acquires, as other-injection-unit malfunction information, malfunction information outputted by the malfunction information output section of another controller contained in the plurality of controllers but different from the controller, and
wherein the other-injection-unit malfunction information acquisition section is configured to carry out a malfunction process for the injection unit based on a preset malfunction process setting corresponding to the other-injection-unit malfunction information when receiving the other-injection-unit malfunction information.

2. The injection molding machine according to claim 1, wherein the other-injection-unit malfunction information acquired by the other-injection-unit malfunction information acquisition section contains malfunction source identification information that identifies the controller having outputted the other-injection-unit malfunction information.

3. The injection molding machine according to claim 1, wherein the other-injection-unit malfunction information acquisition section is configured to automatically carry out the malfunction process.

4. The injection molding machine according to claim 1, wherein each of the plurality of controllers includes a memory storing:
first malfunction process settings of malfunction processes to be carried out by the controller when the injection unit corresponding to the controller malfunctions, and
second malfunction process settings of malfunction processes to be carried out by the same controller when another injection unit among the plurality of injection units malfunctions.

5. The injection molding machine according to claim 4, wherein the first malfunction process settings include at least one of
in response to an excess injection pressure in the injection unit, stopping operation of the injection unit instantly,
in response to resin running out in the injection unit, stopping the operation of the injection unit when a present molding cycle of the injection unit is completed and lowering a set temperature of a heater of the injection unit,
in response to an excess temperature of a heated cylinder of the injection unit, stopping the operation of the injection unit when the present molding cycle of the injection unit is completed and turning off the heater of the injection unit, or
in response to an injection pressure of the injection unit being outside a predetermined range, stopping the operation of the injection unit when the present molding cycle is completed.

6. The injection molding machine according to claim 4, wherein the second malfunction process settings include at least one of
in response to an excess injection pressure in said another injection unit, preventing a start of injection in the injection unit,
in response to resin running out in said another injection unit, stopping the operation of the injection unit when a present molding cycle of the injection unit is completed and lowering a set temperature of a heater of the injection unit,
in response to an excess temperature of a heated cylinder of said another injection unit, stopping the operation of the injection unit when the present molding cycle of the injection unit is completed and turning off the heater of the injection unit, or
in response to an injection pressure of said another injection unit being outside a predetermined range, preventing the start of injection in the injection unit.

7. An injection molding machine comprising:
a plurality of injection units; and
a plurality of controllers corresponding to the plurality of injection units,
wherein each of the plurality of controllers includes
a malfunction detection section that detects malfunction of the injection unit corresponding to the controller,
a malfunction process information output section that reads malfunction process information corresponding to the type of the malfunction detected by the malfunction detection section from a preset malfunction process setting corresponding to the type of the malfunction, stored in advance, and outputs the read malfunction process information, and
an other-injection-unit malfunction process information acquisition section that acquires, as other-injection-unit malfunction process information, malfunction process information outputted by the malfunction process information output section of another controller contained in the plurality of controllers but different from the controller, and
wherein the other-injection-unit malfunction process information acquisition section is configured to carry out a malfunction process for the injection unit based on the other-injection-unit malfunction process information.

8. The injection molding machine according to claim 7, wherein the other-injection-unit malfunction process information acquisition section is configured to automatically carry out the malfunction process.

* * * * *